(12) United States Patent
Refaeian et al.

(10) Patent No.: US 12,102,176 B2
(45) Date of Patent: Oct. 1, 2024

(54) ARRAYED CUSHIONING DEVICE

(71) Applicants: Manouchehr Refaeian, El Paso, TX (US); Alexander Refaeian, El Paso, TX (US); Michael Refaeian, El Paso, TX (US)

(72) Inventors: Manouchehr Refaeian, El Paso, TX (US); Alexander Refaeian, El Paso, TX (US); Michael Refaeian, El Paso, TX (US)

(*) Notice: Subject to any disclaimer, the term of this patent is extended or adjusted under 35 U.S.C. 154(b) by 253 days.

(21) Appl. No.: 17/212,719

(22) Filed: Mar. 25, 2021

(65) Prior Publication Data

US 2022/0304419 A1 Sep. 29, 2022

(51) Int. Cl.
  *A43B 17/14* (2006.01)
  *B29D 35/00* (2010.01)
  *B33Y 80/00* (2015.01)

(52) U.S. Cl.
  CPC .......... *A43B 17/14* (2013.01); *B29D 35/0009* (2013.01); *B33Y 80/00* (2014.12)

(58) Field of Classification Search
  None
  See application file for complete search history.

(56) References Cited

U.S. PATENT DOCUMENTS

| | | | |
|---|---|---|---|
| 2004/0031170 A1* | 2/2004 | Chi | B29D 35/0054 12/142 P |
| 2012/0131816 A1* | 5/2012 | Chasco Perez de Arenaza | A61B 5/6807 36/43 |
| 2017/0303633 A1* | 10/2017 | Hopkins | B33Y 80/00 |
| 2019/0184672 A1* | 6/2019 | Kalish | B32B 27/12 |
| 2021/0330028 A1* | 10/2021 | Conway | B32B 5/026 |
| 2022/0175078 A1* | 6/2022 | Casali | A43B 3/246 |

FOREIGN PATENT DOCUMENTS

EP        1902639 A1 * 3/2008 .......... A43B 1/0009

* cited by examiner

*Primary Examiner* — Elizabeth Collister

(57) ABSTRACT

A cushion device is provided comprising a plurality of cells arranged in an array. Each one of the plurality of cells may comprise a plurality of vertical walls interconnected to form a vertical structure. Each vertical wall of each cell may be connected to an adjacent vertical wall of an adjacent cell such that each cell is connected to a plurality of adjacent cells. Each of the plurality of vertical walls may comprise a port where the port of each vertical wall of each cell may be in fluid communication with an adjacent port of the adjacent vertical wall of the adjacent cell via a fluid aperture.

16 Claims, 4 Drawing Sheets

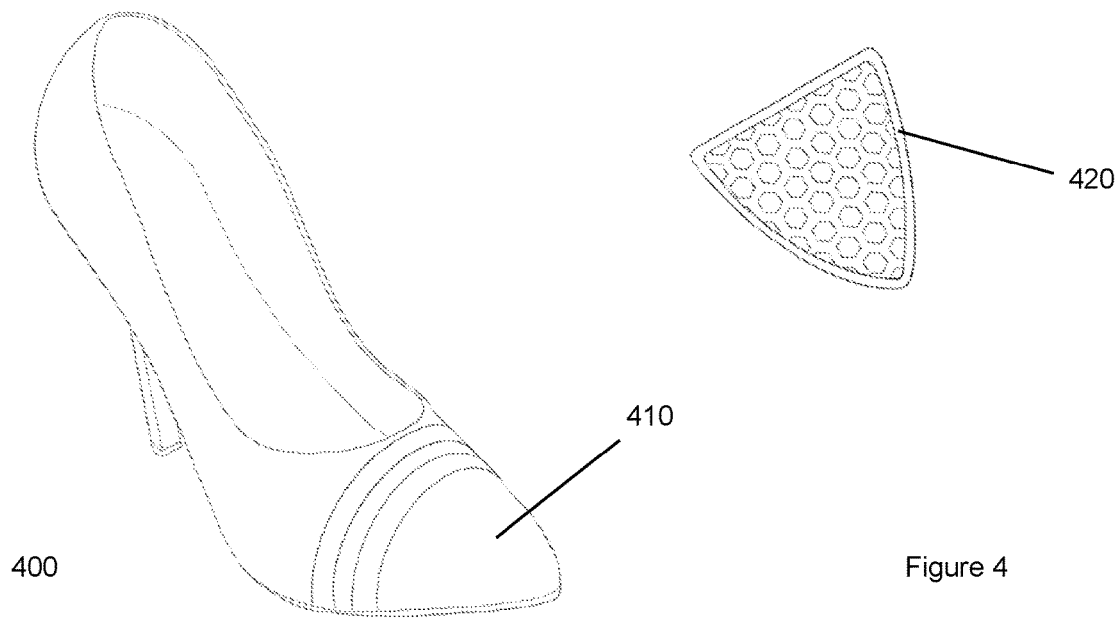
400  Figure 4
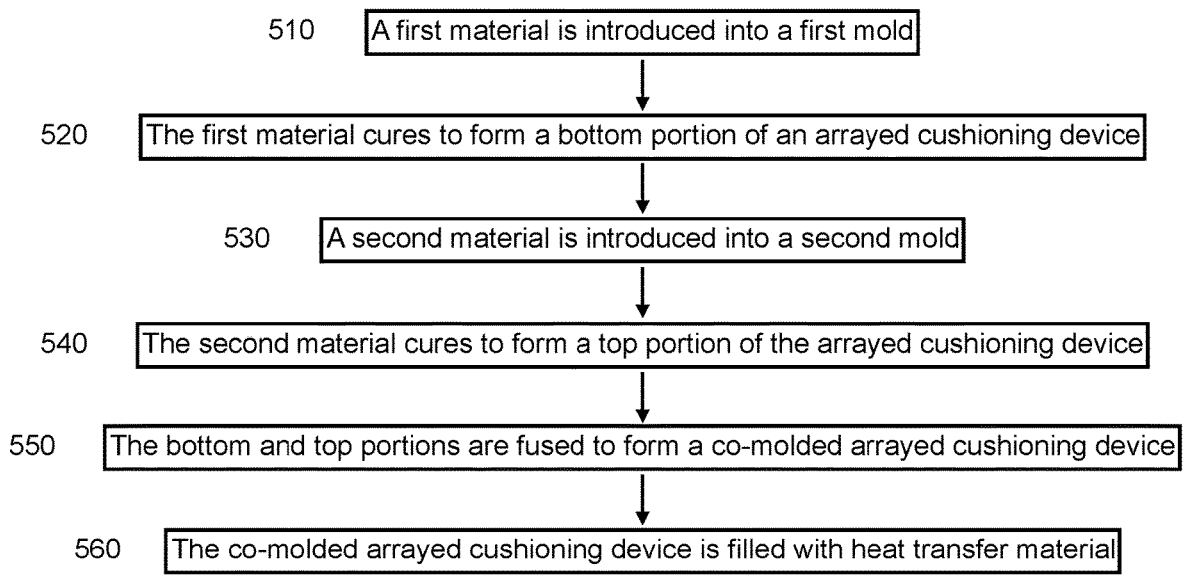
500  Figure 5

ARRAYED CUSHIONING DEVICE

BACKGROUND OF THE INVENTION

This invention relates generally to cushioning devices, products including cushioning devices, and methods of making and using cushioning devices. Cushioning devices have a variety of uses, such as for shoe inserts, shoe insoles, shoe soles, mattresses, mattress toppers, clothing, seating surfaces, packaging, patient support surfaces, furniture surfaces, padding for floors, padding for rooms, padding for exercise equipment, helmets, and other applications. The main goal of the invention is to provide good elastic damping, high rebound or resiliency, and temperature regulation for a variety of these different applications.

Cushioning devices are formed to reduce pressure by absorbing shocks and impacts. In certain applications such as for shoes and mattresses this can increase comfort for the user. In packaging applications the cushioning devices can protect objects from being damaged. The cushioning devices may be formed from materials that deform under load by compressing and are resilient. Different cushioning materials can be selected based on the intended application and may be selected based on their responses to given pressures. Multiple cushioning materials can even be combined to achieve a wider variety of desired properties for the cushioning device.

Certain embodiments refer to the overall general structure which can be applied to any application, while other embodiments refer to the specific applications for shoes such as shoe inserts, soles, and pads. Shoes can include high heels, boots, flats, tennis shoes, sports shoes, flip flops, and the like. Many types of shoes become uncomfortable after extended periods of time being worn. High heeled shoes specifically typically cause pain and discomfort even when worn for only short periods of time because of the high pressure that occurs on specific parts of the foot. Tennis shoes and other sports shoes undergo high impact forces in all directions from running, jumping, changing directions, and abruptly stopping. For these reasons it is also important to provide cushioning devices in tennis shoes and other types of sports shoes to prevent pain, discomfort, and blisters. Most shoes comes with a thin layer of cushion which don't do enough to provide the necessary comfort to the wearer. For this reason many wearers buy separate inserts, soles, and pads for their shoes.

Other issues that arise with prior art cushioning devices, specifically when used in wearable applications or mattress applications, is the heat generated during movement of the user. In shoes the constant compression and movement generates heat that builds up and stays inside the shoe, causing the wearer to sweat which can create discomfort and cause blisters. In mattresses the constant movement can cause the person to overheat which can be uncomfortable and interrupt sleeping patterns.

Over long periods of walking and running the pressure and shocks imparted to the shoes and therefore the feet of the wearer will result in discomfort, stress, and blisters on the wearer's feet. Additionally, inadequate shoe support can create stress fractures, back pain, and even vertebrae issues in the back which can lead to other major issues. In order to solve these and other related problems, an improved shoe cushion device is needed to provide better shock absorption and restoration of force after compression from the wearer's feet.

U.S. Pat. No. 5,042,175 titled 'User-Specific Shoe Sole Coil Spring System and Method' discloses a shoe sole coil spring system with a layout of individual coil springs on the shoe sole. The spring coil cushioning system creates pressure points along the user's foot which can cause pain and discomfort by providing uneven support. Even though the layout of springs is customized, since they are discretely positioned along the foot they will still create an uneven pressure profile which will not adequately support the wearer's foot. There is a need to improve upon this pressure distribution and also provide a shoe cushion which will not break down over time.

U.S. Pat. No. 8,745,894 B2 titled 'Triple Density Gel Insole' discloses a shoe insole incorporating honeycomb patterns. This honeycomb insole improves upon the pressure profile by providing a more even pressure profile along the wearer's foot and also provides damping and resiliency which will not break down over time as typical coil springs do. However, as the wearer walks or runs heat will be generated within the insole, and due to the lack of airflow through the insole this heat will be trapped in the insole causing the feet to sweat. This buildup of sweat and heat within the shoe will cause blisters, create a foul smell, and can even allow bacteria and fungi to accumulate which can lead to athlete's foot and other problems.

The rate of a wearer's heat exchange with the environment is dependent upon a number of factors, such as activity level, environmental factors such as temperature and humidity, and the characteristics of the shoe they are wearing. The transfer of body heat from the skin of the wearer's foot through their shoe takes place mainly by conduction and convection. Many prior art cushion devices have attempted to overcome the issue of temperature regulation in cushioning devices, and specifically in shoe cushioning devices, but usually at the cost of losing the damping and resilience abilities of the shoe. There is a need for a shoe which can provide the necessary damping and resilience, while also regulating the temperature based on the needs of the wearer.

To overcome the issues with prior art cushioning devices, the present invention incorporates a honeycomb or hexagonal array of elastic, compressible material which can constructed in a way to either allow or restrict airflow or flow of another fluid to provide the desired amount of compression and cooling airflow. Alternatively, the array can be enclosed and include a cooling fluid to better control temperature. In shoes this will enhance comfort by enhancing damping and even pressure support, while also preventing sweating and blisters.

In applications other than shoes, the cushioning devices can be structured similarly to provide the same or similar advantages. For example, mattresses can be structured nearly identically to shoe cushion devices just on a larger scale. The benefits of the present invention in mattresses is that the resiliently compressible material will provide even pressure support which are more comfortable than prior art mattresses and can also provide temperature regulation to improve sleep patterns. In other seating and support surfaces, wearable applications where the device is integrated into clothing or helmets, shipping and packaging applications, and the like the advantages are identical to that of the shoes and mattresses.

Embodiments of the present general inventive concept provide a simple and efficient cushioning device formed of a honeycomb or hexagonal array of cells which can improve comfort by enhancing cushioning and reducing heat generation. When utilized in a shoe the cushioning device can be integrally formed within the sole of the shoe or can be a separate insert.

BRIEF DESCRIPTION OF THE DRAWINGS

FIG. 4 is an overview of an alternative shoe insert to be utilized in a high heel shoe in accordance with some embodiments of the present invention.

FIG. 5 is a flow chart of a method of manufacture of an arrayed cushioning device in accordance with some embodiments of the present invention.

DETAILED DESCRIPTION OF THE INVENTION

Figure 1A:
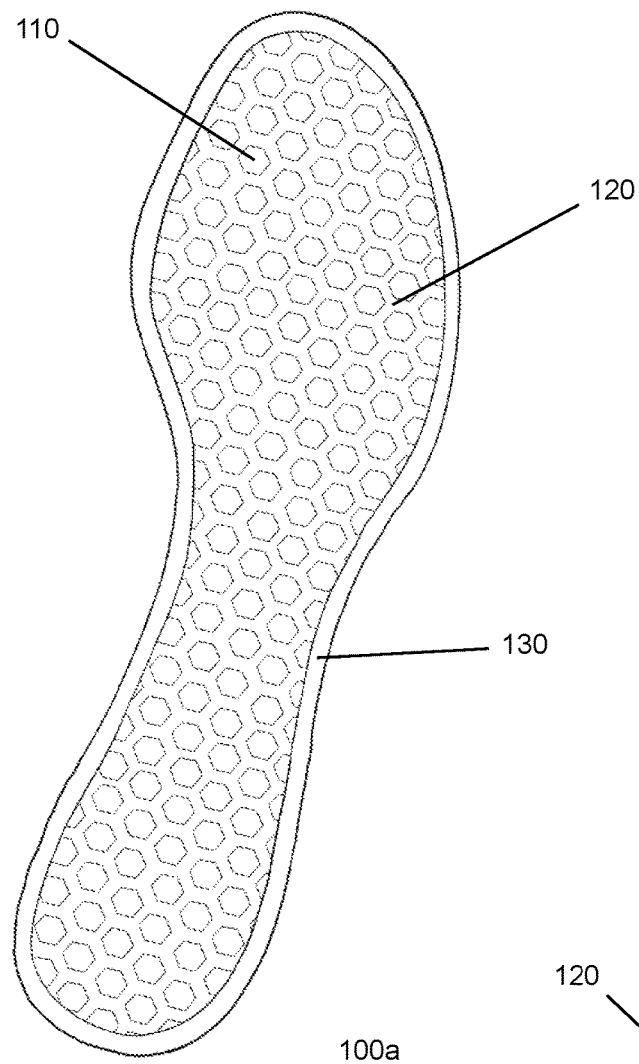
FIG. 1A is an overhead view of a top side of an arrayed cushioning device in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a cushioning device" also includes a plurality of cushioning devices and the like.

In some embodiments, a cushion device is provided comprising a plurality of cells arranged in an array, wherein each one of the plurality of cells comprises: a plurality of vertical walls interconnected to form a vertical structure, wherein each vertical wall of each cell is connected to an adjacent vertical wall of an adjacent cell such that each cell is connected to a plurality of adjacent cells; and each of the plurality of vertical walls comprises a port, wherein the port of each vertical wall of each cell is in fluid communication with an adjacent port of the adjacent vertical wall of the adjacent cell via a fluid aperture; wherein, when external pressure is applied to the cushion device within a first area at one or more of the plurality of cells to compress the one or more of the plurality of cells from an initial state to a compressed state, a fluid flows in a first direction from the first area within the one or more of the plurality of cells into a second area within one or more adjacent cells; and wherein, when the external pressure is released from the cushion device within the first area at the one or more of the plurality of cells to restore the one or more of the plurality of cells to the initial state from the compressed state, the fluid flows in a second direction opposite the first direction from the second area within the one or more adjacent cells into the first area within the one or more of the plurality of cells.

In some embodiments, the cushion device is a shoe insert or a shoe insole, and wherein each of the vertical structures comprises a bottom wall such that the fluid is prevented from flowing downward towards a ground surface and is forced upward towards a foot of a wearer.

In some embodiments, the cushion device is a shoe insert or a shoe insole, and wherein each of the vertical structures comprises a top wall and a bottom wall such that the plurality of cells form an enclosed space containing the fluid therein which is prevented from flowing downward towards a ground surface and is prevented from flowing upward towards a foot of a wearer.

In some embodiments, the enclosed space formed between the top walls, the bottom walls, and the vertical walls of the cells contains a cooling fluid therein for cooling the foot of the wearer.

In some embodiments, the cooling fluid comprises hydroxyethyl cellulose, sodium polyacrylate, silica gel, phase change material or combinations thereof for selectively cooling the foot of the wearer.

In some embodiments, the phase change material comprises a phase transition temperature of greater than 100 degrees Fahrenheit, and wherein the cooling fluid changes phase at the phase transition temperature such that the phase change material absorbs heat from the foot of the wearer.

In some embodiments, each of the plurality of cells is a hexagonal cell comprising six vertical walls, and wherein each port is a semi-cylindrical port and each fluid aperture is a semi-cylindrical fluid aperture.

In some embodiments, the semi-cylindrical ports are larger in diameter than the semi-cylindrical fluid apertures.

In some embodiments, the cushion device is manufactured by co-molding, injection molding, or additive manufacturing.

In some embodiments, a material of the cushion device comprises neoprene, guayule, neogreen, lycra, thermocline, silicon rubber, plant-based elastomer, or combinations thereof.

In some embodiments, a cushion device is provided comprising a plurality of hexagonal cells arranged in a fluidically sealed array, wherein each one of the plurality of hexagonal cells comprises: six vertical walls interconnected to form a hexagonal vertical structure, wherein each vertical wall of each hexagonal cell is connected to an adjacent vertical wall of an adjacent hexagonal cell such that each hexagonal cell is connected to six adjacent hexagonal cells; and a port disposed within each of the plurality of vertical walls, wherein the port of each vertical wall of each hexagonal cell is in fluid communication with an adjacent port of the adjacent vertical wall of the adjacent hexagonal cell via a fluid aperture; wherein, when external pressure is applied to the cushion device within a first area at one or more of the plurality of hexagonal cells to compress the one or more of the plurality of hexagonal cells from an initial state to a compressed state, a positive pressure differential is created within the first area that causes a fluid to flow in a first direction from the first area within the one or more of the plurality of hexagonal cells into a second area within one or more adjacent hexagonal cells; and wherein, when the external pressure is released from the cushion device within the first area at the one or more of the plurality of hexagonal cells to restore the one or more of the plurality of hexagonal cells to the initial state from the compressed state, a negative pressure differential is created within the first area that causes the fluid to flow in a second direction opposite the first direction from the second area within the one or more adjacent hexagonal cells into the first area within the one or more of the plurality of hexagonal cells.

In some embodiments, a method of manufacturing a cushion device is provided, the method comprising: molding a first body, wherein the first body comprises a plurality of hexagonal cells arranged in an array, and wherein each one of the plurality of hexagonal cells comprises: six vertical walls interconnected to form a hexagonal vertical structure enclosed by a bottom surface, wherein each vertical wall of each hexagonal cell is connected to an adjacent vertical wall of an adjacent hexagonal cell such that each hexagonal cell is connected to six adjacent hexagonal cells; and a semi-cylindrical port disposed within each of the plurality of vertical walls, wherein the semi-cylindrical port of each vertical wall of each hexagonal cell is in fluid communication with an adjacent semi-cylindrical port of the adjacent vertical wall of the adjacent hexagonal cell via a semi-cylindrical fluid aperture such that any two adjacent vertical walls share a common semi-cylindrical fluid aperture; molding a second body, wherein the second body comprises a top surface; and co-molding the first body to the second body, wherein the first body is fused to the second body to fluidically seal the array of hexagonal cells between the bottom surface and the top surface, wherein, when external pressure is applied to the cushion device within a first area at one or more of the plurality of hexagonal cells to compress the one or more of the plurality of hexagonal cells from an initial state to a compressed state, a positive pressure differential is created within the first area that causes a fluid to flow in a first direction from the first area within the one or more of the plurality of hexagonal cells into a second area within one or more adjacent hexagonal cells, and wherein, when the external pressure is released from the cushion device within the first area at the one or more of the plurality of hexagonal cells to restore the one or more of the plurality of hexagonal cells to the initial state from the compressed state, a negative pressure differential is created within the first area that causes the fluid to flow in a second direction opposite the first direction from the second area within the one or more adjacent hexagonal cells into the first area within the one or more of the plurality of hexagonal cells.

Exemplary embodiments of the present invention are illustrated in the accompanying figures. As shown in FIG. 1A, a cushioning device in the form of a shoe insert 100a is provided. The top side of this insert 100a is shown in FIG. 1A. The shoe insert 100a is comprised of a honeycomb array of cells 110 defined by a plurality of six-sided vertical structures 115. The cells 110 and the vertical structures 115 are hexagon shaped and extend across the entirety of the shoe insert 100a except a perimeter of the shoe insert 100a, which is solid as shown and surrounds the array. The six-sided vertical structures 115 of the cells 110 are joined in a manner to form central joints 120.

Figure 1B:
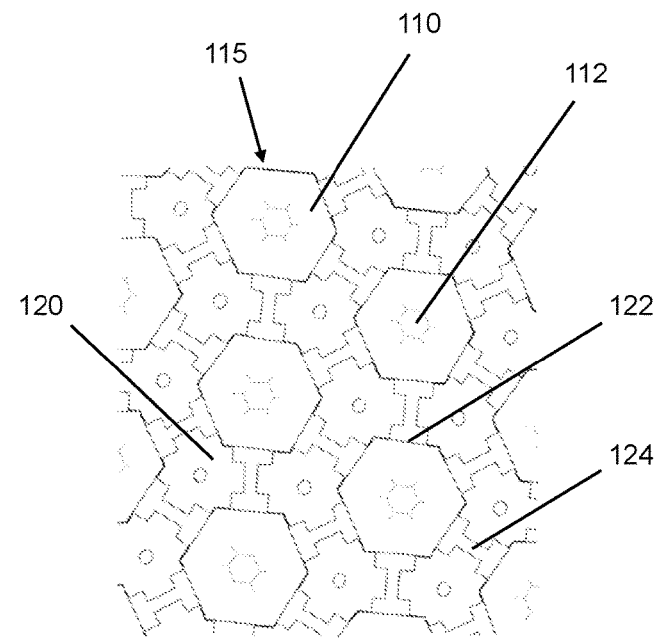
FIG. 1B is a detailed view of the top side of the arrayed cushioning device shown in FIG. 1A in accordance with some embodiments of the present invention.

FIG. 1B shows a detailed view of the shoe insert 100a of FIG. 1A. The hexagonal cells 110 are hollow and may have a flat or a curved bottom. Preferably the bottom 112 of each of the cells 110 is indented. Each cell 110 is surrounded by a corresponding six-sided vertical structure 115 such that each cell 110 defines a hexagonal shape.

Each side of the six-sided vertical structures 115 may comprise a fluid port 122 and a corresponding fluid aperture 124 coupling any two adjacent vertical structures 115. Preferably the shape of the fluid port 122 and the fluid aperture 124 is semi-cylindrical but the shape may also be triangular, square, oval, rectangular, star-shaped, hexagonal, or shaped otherwise in cross section. Each six-sided vertical structure 115 is coupled to six other six-sided vertical structures 115 by the respective fluid ports 122 and fluid apertures 124.

Although the present invention is described with an array of hexagonal cells, it is also envisioned that other shapes can be used. For example the array of cells may be circular in shape with any number of fluid ports connected between adjacent cells. Alternatively the array of cells can be triangular, square, diamond, rectangular, pentagonal, octagonal, star-shaped, or any other polygon shape.

Furthermore, although the present invention includes a single port interconnecting any two adjacent vertical structures, any number of ports can interconnect any two adjacent vertical structures. For example, the number of ports interconnecting any two adjacent vertical structures can be two, three, four, five, six, seven, eight, nine, ten, or more. The number of ports depends on the shape of the array of cells and also the size of the individual cells. For larger cells there will be less cells in the array and therefore more ports between the adjacent vertical structures may be more desirable. This may also be more desirable in larger applications such as for mattresses. For smaller applications less ports may be desirable. The preferred number of ports of the present invention between any two adjacent vertical structures is one, since the size of the cells is small when used in a shoe insert and a single port will provide sufficient air flow between cells.

In some embodiments, each vertical structure 115 does not comprise a top surface or a bottom surface in order to allow the free flow of air or other fluid therethrough. Alternatively, each vertical structure 115 may comprise a bottom surface acting as a substrate in order to restrict airflow towards the user's foot. Alternatively, each vertical structure may comprise a top surface and a bottom surface in order to contain air or cooling fluid. The use of cooling liquid therein will allow the user's foot to be cooled utilizing either a gaseous or liquid cooling medium. It is preferred that top and bottom surfaces are included to contain and direct airflow or liquid flow through the array of cells.

Phase change materials may also be used, which are a substance or combination of substances that melt or solidify at a phase transition temperature to enable the substance to absorb or release amounts of heat energy interactively. Phase change materials change between solid and liquid states at the phase transition temperature. The phase transition temperature is a function of the physical properties of the phase change material. Phase change materials are widely used in wearable applications and change phase within a desired range of temperatures to provide the necessary cooling action, which would provide for heat exchange with the wearer.

The cooling liquid may be any suitable fluid including, but not limited to, hydroxyethyl cellulose, sodium polyacrylate, silica gel, and various phase change materials. Phase change materials typically include eutectic materials, hydrocarbon paraffins, and salt hydrates. A mixture or composition of more than one phase change material can also be used to customize the phase transition temperature. Alternatively a mixture of one or more phase change materials and other additives can be used. Possible additives can include fragrant additives which may reduce odors in certain applications such as shoe inserts, colored additives which may be visible if the insert is transparent, or any other type of additive.

Specific examples of phase change materials that are suited for wearable applications include but are not limited to 1-Cyclohexylooctadecane, 2-Heptadecanone, 3-Heptadecanone, 4-Heptadacanone, 9-Heptadecanone, Acetamide, Acetic acid, Acrylic acid, Actanilide, Alpha napthol, Aluminium, Azobenzene, Bees wax, Benzamide, Benzoic acid, Benzylamine, Bromcamphor, Camphene, Camphenilone, Capric acid, Caprilic acid, Caprylone, Catechol, Cetyl acid, and combinations thereof.

The phase transition temperature can be within a specific range selected based on the type of shoe or based on the desired temperature levels of the wearer. For example, a comfortable range from some wearers may be less than 90 degrees Fahrenheit, such as between 40 and 90 degrees Fahrenheit, between 40 and 50 degrees Fahrenheit, between 50 and 60 degrees Fahrenheit, between 60 and 70 degrees Fahrenheit, between 70 and 80 degrees Fahrenheit, or between 80 and 90 degrees Fahrenheit. The range may be selected based on the needs of the wearer, the climate, the type of shoe, or the like. A lower temperature range may be desirable for athletes, while higher temperature ranges may be desirable for more casual use shoes. The preferred range for the present invention to maintain the temperature level is between 50 and 60 degrees, as this will provide the desired cooling effect during athletic activities but will not be too cold during normal wear.

It is also envisioned that a warming liquid can be used for wearer's that prefer for their feet to be warmer or for use in slippers. A phase change material can be used for warming a wearer's foot to maintain the wearer's feet within a desired temperature range. For example, a phase transition temperature to provide comfortable temperatures for some wearers may be more than 90 degrees Fahrenheit, such as between 90 and 140 degrees Fahrenheit, between 90 and 100 degrees Fahrenheit, between 100 and 110 degrees Fahrenheit, between 110 and 120 degrees Fahrenheit, between 120 and 130 degrees Fahrenheit, or between 130 and 140 degrees. Again, the range may be selected based on the needs of the wearer, the climate, the type of shoe, or the like. When a warming liquid is used the preferred range will be between 100 and 110 degrees, since this is high enough to keep the wearer's feet warm but not too uncomfortably warm where it could cause discomfort from the heat or burn the wearer.

The ports 122 and aperture 124 connecting adjacent walls of each six-sided vertical structure 115 are shown to form an H shape, such that ports 122 are larger than apertures 124. The enlarged ports 122 allow the air, fluid, or cooling liquid in each cell 110 to be more freely guided into the apertures 124 and flow between adjacent cells 110. It is also envisioned that the ports 122 can taper from a larger opening at the cell 110 to a smaller opening at the aperture 124 such that the air, fluid, or cooling liquid is smoothly guided into the aperture 124. When aperture 124 is cylindrical and port 122 is tapered it preferably forms a conical shape. This will provide a smoother flow since there are less abrupt corners and the air, fluid, or cooling liquid will not collect in the corners of the ports 122.

When ports 122 and aperture 124 are semi-cylindrical and the semi-cylindrical ports 122 are larger in diameter than the cylindrical aperture 124 an interconnection is formed. This interconnection of any two adjacent cylindrical ports 122 and the shared cylindrical aperture 124 forms a three dimensional dumbbell shape, since the larger diameter port 122 steps down to the smaller diameter aperture 124, which then steps up to the other larger diameter port 122.

In FIG. 1B, the ports 122 and aperture 124 are defined in the upper surface of the six-sided vertical structures 115 and do not extend the entire thickness of device 100a. For example, the ports 122 and aperture 124 may extend less than 90%, less than 80%, less than 70%, less than 60%, less than 50%, less than 40%, less than 30%, less than 20% or even less than 10% of the thickness of the device 100a. It is preferred that ports 122 and aperture 124 extend between 40% and 60% of the thickness of the device 100a so as to provide the necessary amount of flow restriction between cells to cushion or absorb any shock. The height of these ports 122 and aperture 124 may be selected based on the desired amount of damping and resilience. The smaller height for ports 122 and aperture 124 may be chosen to provide more resistance to flow and thereby allows less compression of device 100a. The opposite is true for selecting a larger height for the ports 122 and aperture 124. The height of ports 122 may be different from the height of aperture 124. The height of ports 122 being greater than the height of aperture 124 would help funnel flow through the aperture 124, while the height of ports 122 being less than the height of aperture 124 would provide more restriction to flow.

It is also envisioned that in order to better control or restrict the flow of air, fluid, or cooling liquid, that one or more of the ports 122 and aperture 124 can include a valve. The valve is preferably a two way valve but in certain applications a one way valve or check valve may also be used to control the direction of flow. The valve may be a separate component installed into the ports 122 and aperture 124, however it is preferable that if valves are to be incorporated that they are integrally manufactured with the rest of the cushion device 100a. This will reduce manufacturing time and costs and also simplify the cushion device 100a. The valve is preferably small, flat, and thin to reduce bulkiness and is preferably formed of the same material as the rest of the cushion device 100a, thereby providing the valve with resiliency to deform back to its initial state. Slit valves, flap valves, and duckbill valves are a few types of valves which can be integrally formed with the cushion device 100a.

When top and bottom surfaces are utilized to fully enclose the array of cells 110, the air, fluid, or cooling liquid contained within the array will not be allowed to escape from the cells 110, thereby providing additional elastic cushioning to the structure. This may be desirable for athletic shoes where high forces and impacts occur in order to allow the user to more quickly change direction or better cushion larger forces during running or stopping.

Alternatively, when top and bottom surfaces are utilized to fully enclose the array of cells 110, the air, fluid, or cooling liquid contained within the array may escape via one or more outlet apertures when the array of cells 110 is compressed. The compressed flow of air, fluid, or cooling liquid through the fluid apertures 124 provides additional elastic cushioning to the shoe insert 100a but less so than the fully enclosed embodiment, since flow may escape but in a restricted manner.

The outlets may be incorporated into the perimeter wall 130 of the shoe insert 100a, the top surface, the bottom surface, or any combination thereof. The outlets may be round, oval, triangular, square, rectangular, star-shaped, hexagonal shaped, or may take any other shape. The number of outlets may vary based on the desired amount of elastic compression. More outlets will result less restriction for the flow to escape while results in less elastic cushioning, and less outlets will result in more restriction for the flow to escape which will provide more elastic cushioning. The size of the outlets may also be adjusted based on the desired amount of cushioning effect. Larger outlets reduce the restriction of flow to escape to provide less elastic cushioning, while smaller outlets increase the amount of flow restriction and will provide more elastic cushioning. The number of outlets will preferably be more than 1 but less than 50, however any number of outlets can be used. The diameter of the outlets will preferably be 1 cm or less, however the diameter of the outlets can be adjusted based on the desired amount of elastic cushioning and size of the shoe. In the preferred embodiment there are no outlets in order to fully enclose and contain the air or other fluid within the array of cells and provide more cushioning effect.

The configuration of FIG. 1B shows the ports 122 and aperture 124 connecting any two adjacent walls of any two adjacent six sided vertical structures 115. However, it is also possible to connect any two adjacent corners of any two adjacent six sided vertical structures 115. This may be preferable because the air, fluid, or liquid in a cell 110 when compressed will tend to be formed into the corners of the cell 110. The corners may help funnel the air, fluid, or liquid from one cell 110 to an adjacent cell 110 through the ports 122 and aperture 124.

It is also possible that not all of the walls or corners of any two adjacent cells 110 are connected. For example, it is possible to only connect 1, 2, 3, 4, or 5 of the walls in order to control the direction of flow. Furthermore, less connections means airflow is more restricted which resists compression and this may be more desirable in certain applications. It is preferred, however, that each wall of any two adjacent cells are connected by a port in order to evenly distribute flow between the adjacent cells in the array.

When only a bottom surface is incorporated onto the bottom of cells 110, air within the cushion device 100a when compressed can be forced upward toward the foot of the wearer, thereby helping cool the wearer's foot and prevent heat from building up within the cushion device 100a. In this configuration the array of cells 110 may or may not include outlets in the perimeter 130 as discussed previously. The outlets are not necessary since air can escape upward. However, they may be desirable to help air escape faster such that there is less resistance during compression.

When only a top surface is incorporated onto the top of cells 110, air within the cushion device 100a when compressed can be forced downward away from the foot of the wearer, thereby preventing heat from building up within the cushion device 100a. In this configuration the array of cells may or may not need outlets in the perimeter 130 as discussed previously. The outlets would provide the same function as when only a bottom surface is incorporated, such that it would help air escape faster so there is less resistance during compression.

When top and bottom surfaces are incorporated onto the top and bottom of cells 110 outlets may or may not be provided. Since air cannot escape from the cushion device 100a upwardly or downwardly, the outlets may be preferable otherwise the cushion device 100a may have too much resistance during compression. Further, each of the outlets in the perimeter 130 may incorporate an aforementioned slit valve, flap valve or duckbill valve in order to allow air to slowly flow out of the cushion device 100a during compression but to quickly re-inflate during decompression, thereby providing a robust level of elastic resistance to the device 100a while maintaining this level elastic resistance during fast repetitive actions such as running. The outlets would also allow air to circulate such that heat would not build up.

In this configuration utilizing top and bottom surfaces, the outlets can be omitted and the air replaced with a cooling fluid or phase change material. The cooling fluid could be free to circulate between cells 110 but enclosed within the cushion device 100a completely. It is possible to provide an inlet, an outlet, or a common port when a cooling fluid is used. This would allow the cushion device 100a to be filled with the cooling fluid or allow the cooling fluid to be drained therefrom. This may be preferred in order to allow the amount or type of fluid to be adjusted. Alternatively, the cushion device 100a can be prefilled with cooling fluid such that no inlet, outlet, or other ports are needed. This may be preferable to prevent leakage of the cooling fluid.

If an inlet, outlet, or common port is provided for filling or draining the cooling fluid, a plug or valve is necessary. The plug or valve may take various configurations. The plug may be a screw on plug or a stopcock type plug. The valve may be a one-way or two-way valve depending on the intended use of the inlet, outlet or port. Similar to the valves described previously, these valves may be separately attached or integrally manufactured with the cushion device 100a. Integral manufacturing of the plugs or valves is simpler, more cost effective, and reduces manufacturing time.

The bottom of each cell 110 may also define an indentation 112 that provides support to the surrounding walls of structure 115 of the cell 110. The bottom may form a hexagonal indentation 112. It may also take a variety of shapes, however, hexagonal to match the hexagonal shape of the walls of structure 115 is preferable. Indentation 112 is a smaller shaped hexagon than the six-sided vertical structure 115 such that the walls and corners of indentation 112 align with the walls and corners of structure 115. The width and height of the indentation 112 may vary, however it is preferable that the width is about half of the width of the cell 110 and it is preferable that the height is about half of the height of the structure 115.

Although the indentation 112 formed by the bottom are preferably hexagonal in shape, it is possible to provide circular, triangular, square, pentagonal, star shaped, or other polygon shapes for the indentation 112. The indentation 112 may also include support ribs extending radially outward from each corner or radially outward from each wall of the indentation to provide additional support. The support ribs may extend partially from the indentation 112 to the adjacent corner or wall of cell 110, or may extend all of the way to the corner or wall of cell 110. The height and thickness of the support ribs is preferably minimal in order to provide a minor amount of additional support in a manner which does not obstruct flow of air, fluid, or liquid through the cells 110. The support ribs may also be provided on the front side, rear side, or on both sides of the cushion device 100a.

As shown in FIG. 1B, each central joint is surrounded by three adjacent cells 110. The central joint 120 is partially bordered by one corner and two walls of each of the three cells 110. The central joint 120 is also partially bordered by the ports 122 and aperture 124 connecting the adjacent walls of each of the three cells 110. When the ports 122 and aperture 124 form the H shape as shown, the central joint 120 forms a 21 sided polygon.

The central joint 120 also includes a concave indentation at its center. The concave indentation is preferably a perfect hemisphere. This concave indentation in the central joint 120 may have the purpose of enabling deformation of the central joints 120 or may be provided solely for manufacturing purposes, such as for releasing the device 110a from a mold when injection molding.

Figure 2A:
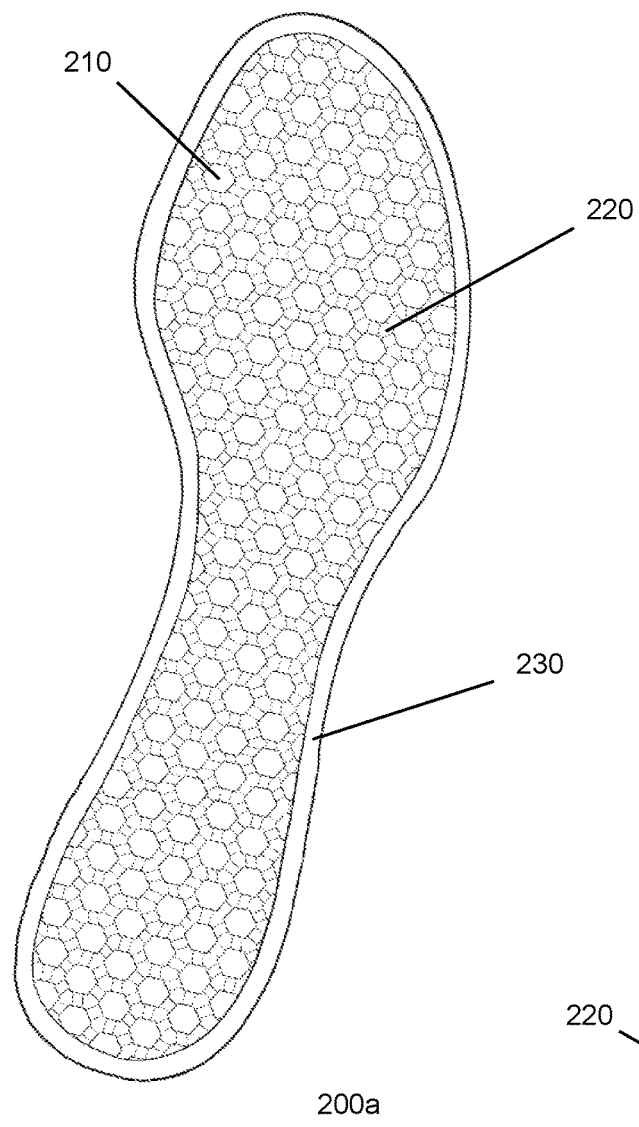
FIG. 2A is an overhead view of a bottom side of an arrayed cushioning device in accordance with some embodiments of the present invention.
Figure 2B:
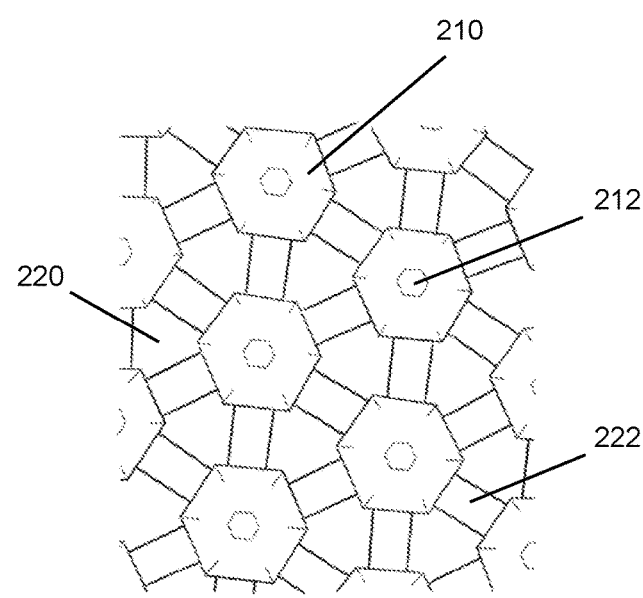
FIG. 2B is a detailed view of the bottom side of the arrayed cushioning device shown in FIG. 2A in accordance with some embodiments of the present invention.

FIGS. 2A and 2B show a bottom side of the device 100a shown in FIGS. 1A and 1B. The features of device 100a shown in FIGS. 1A and 1B inversely correspond to the shape of the features shown in FIGS. 2A and 2B. The rear side 210 of cells 110 form a hexagonal protrusion 212 that inversely corresponds to the hexagonal indentation 112 forming cells 110. Spaces 220 between the rear side 210 of cells 110 are left hollow and are opposite to central joints 120. Likewise bottom perimeter edge 230 corresponds to the shape of top perimeter edge 130.

The shape of spaces 220 inversely correspond to the shape of central joints 120 including the concave indentation at its center. The shape of spaces 220 also inversely correspond to the shape of ports 122 and apertures 124. This configuration is preferable to having the spaces 220 be filled with material since it greatly reduces the weight of the device 100*a*.

The bottom of each cell 110 includes a protrusion 212 which inversely corresponds to the shape of indentation 112. Preferably the shape of protrusion 212 is hexagonal, but it must match the shape of indentation 112 such that the walls and corners of protrusion 212 match the walls and corners of indentation 112 and also align with the walls and corners of structure 115.

Figure 3:
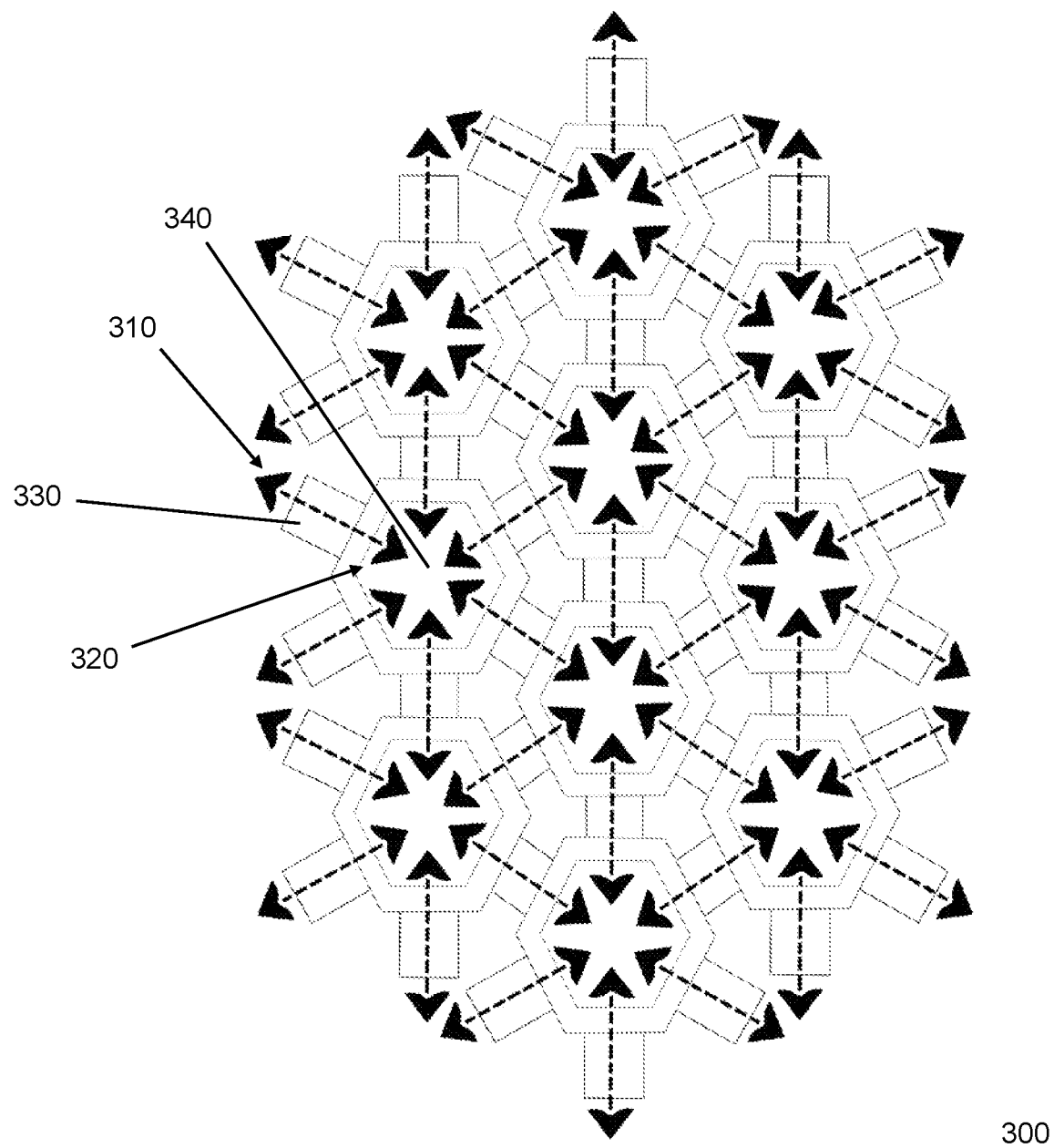
FIG. 3 is a cross-sectional view of a hexagonal array of air cells in accordance with some embodiments of the present invention.

FIG. 3 shows a cross-sectional view of a hexagonal array of air cells forming a cushion device 300. An array of cells 340 are shown, these cells 340 being hexagonal in shape. The cells 340 are defined by six neighboring walls 320. Each wall 320 is connected to an adjacent wall of an adjacent identical cell 340 by an aperture 330. The apertures 330 allow two directional flow as represented by two directional arrows 310 between the neighboring cells 340 of either air, fluid, or liquid.

The walls 320, apertures 330, and cells 340 are shaped and constructed similarly to the walls of structure 115, apertures 124, and cells 110 shown in FIGS. 1A and 1B. The ability to provide two directional flow between neighboring cells 340 enables flow to circulate through the entire array of cells 340 as a single enclosed space. Flow may be free to circulate through apertures 330 or it may be restricted or controlled by valves as discussed previously.

It is also to separate this single enclosed space formed by the array of cells 340 into multiple spaces by omitting certain apertures 330 between certain cells 340. For example, when device 300 is incorporated into an insole for a shoe it may be desirable to separate the cells 340 near the ball of the foot from the cells 340 near the heel of the foot. For example, an enclosed space near the heel may interconnect anywhere from 5 to 25 cells 340. An enclosed space near the heel may interconnect anywhere from 5 to 25 cells 340. The number of cells 340 depends on the size of the cells 340 in relation to the overall size of the insole. If larger cells 340 are utilized, it is possible that only 5 cells 340 would form an enclosed space at the heel and ball of the foot. If smaller cells 340 are used then a greater number of cells may be interconnected. Any number of enclosed spaces may be used, and may depend on the given application. For larger applications such as mattresses more enclosed spaces may be used and may be used to separate and target different body parts of the person. In mattresses the cells 340 on one side of the bed may be separated from the cells 340 on another side to isolate one person's side of the bed form another person's side of the bed. This would prevent shifting of one person's side of the bed when the other shifts or moves.

Using smaller cells may be preferable to using larger cells since a smaller size of cells would require more cells to spread across the device and would provide a much more even distribution of pressure. Larger cells would result in a smaller number of cells which would only compress in the area of the cells 340 rather than across the entire device 300.

FIG. 4 shows an alternative shoe insert device 420. This shoe insert device 420 is constructed similarly to the shoe insert 100*a* shown in FIGS. 1A and 1B, with the exception that the overall shape of the insert device 420 only encompasses a portion of the shoe. The device 420 is for use at the front of the foot and only supports the toes and ball of the foot, whereas device 100*a* supported the entire foot of the wearer. The device 420 is generally triangular shaped since it is specifically intended to be used in the front 410 of high heel 400.

The shoe insert device 420 is specifically shaped to fit in the front 410 of a high heel shoe 400. The device 420 could also be shaped to fit in any part of any shoe. For example the device 420 can be shaped to fit in the heel of an athletic shoe.

The cushion devices of the present invention may be manufactured with a size and shape that is specific to their application. Cushion devices used in shoes can be customized based on the user's foot or feet. For example, a 3D scan can be taken of the person's foot or feet and the cushion devices can be custom manufactured based on the size and shape of their foot. It is also envisioned that a 3D scan can be taken of the person's foot or feet and the person can select the area or areas where they want additional support. The cushion devices can then be manufactured based on a combination of the scan and the person's selections.

The device may be manufactured in a variety of ways. The most preferable ways are through co-molding, injection molding, and 3D printing or additive manufacturing techniques. For injection molding, the material is injected into a mold and allowed to cure. After the material cures the device can then be removed from the mold. With additive manufacturing, the material is deposited layer by layer to create the final product. Additive manufacturing is useful for manufacturing products with more intricate details and features, while injection molding may be more efficient for mass production of the cushion devices.

The preferred method of manufacturing is co-molding. A first body is molded and includes an array of cells and an integral bottom layer. A second body is molded and includes a top layer. The first body and second body are then fused together to enclose the array of cells and create a unitary co-molded device.

FIG. 5 is a flow chart of a method of manufacturing an arrayed cushion device in accordance with the preferred method of manufacture, which in this case is co-molding. Steps 510, 520, 530, 540, 550, and 560 describe the individual steps carried out in order to produce the arrayed cushion device.

In step 510, a first material is introduced into a first mold. The first material is a liquid or semi-liquid material which is used to manufacture the cushion device, and is preferably neoprene, however other materials such as guayule, neogreen, lycra, thermocline, rubber, silicon rubber, plant based elastomers, or combinations thereof can be used. The mold includes two mold halves which are closed together to form the features of the array of cells and bottom surface cushion device.

In step 520, the first material cures in the first mold and forms a first body. The first body includes an array of cells and a bottom surface to form a partially enclosed array of cells. After the first body is cooled, the first mold is opened and the first body is removed from the first mold.

In step 530, a second material is introduced into a second mold. The second material is a liquid or semi-liquid material which is used to manufacture the cushion device, and is preferably neoprene, however other materials such as guayule, neogreen, lycra, thermocline, rubber, silicon rubber, plant based elastomers, or combinations thereof can be used. The first material is preferably the same as the second material. The second mold can also include two mold halves which are closed together to form the features of the top layer of the cushion device.

In step 540, the second material cures in the second mold and forms a second body. The second body includes a top layer. After the second body is cooled, the second mold is opened and the second body is removed from the second mold.

In step 550, the first body is fused with the second body to form a co-molded unitary cushion device. The second body which forms the top layer is fused to the first body opposite from the bottom surface to form an enclosed array of cells. In this configuration the bottom surface encloses a bottom side of the array of cells and the top layer encloses a top side of the array of cells such that the array is cells is fully enclosed to contain air or other fluid therein.

Step 560 is optional based on the fluid that is to be contained within the enclosed array of cells. If air is the fluid to be contained within the enclosed array of cells, then step 560 is omitted. However, if cooling liquid, phase change material, or other heat transfer fluid is to be contained within the array of cells, then step 560 is carried out. Step 560 can include various methods to fill the enclosed array with the fluid. A first method can include injecting the fluid into the array of cells with a syringe or the like. Another method can include filling the array of cells through a fill port incorporated into the first body or second body and then closing the fill port.

The overall thickness of the cushion devices are preferably less than an inch when used for shoe applications and preferably in the range of 0.1 to 1.0 inches. Thinner cushion devices are more preferable for everyday casual shoes, while thicker cushion devices may be more preferable for higher impact applications such as athletic shoes. When used for mattress and mattress topper applications the thickness will be much greater, and likely in the range of 1 to 12 inches.

The overall size of the device can be selected in order to match the size of the shoe it is to be used with or to match the size of the wearer's foot. The shoe insert device 100*a* shown in FIG. 1A can be manufactured for all sizes, for example in all US sizes for adult, children, and toddler shoes.

The color of the device can also be selected in order to match the color of the shoe it is to be used with or it may be selected by the user based on their personal preferences. It is possible to manufacture the device in a variety of solid colors, mixture of colors, and even with various designs so that people can choose the color or design.

When the device 100*a* is shaped for a full shoe as in FIG. 1A it is also possible to print the size of the device on the top or bottom of the shoe insert cushion device 100*a*. If the device 420 is shaped for a specific type of shoe such as a high heel shoe 400 as in FIG. 4 it is possible to label the device on the top or bottom to indicate to the user what type of shoe the device is to be used with. It is also possible to label the devices with left or right so that the wearer knows which shoe the device is to be inserted into and to label the devices with top or bottom so that the wearer knows which side of the device should face up and which side should face down.

The devices of the present invention can be manufactured from a variety of materials. Preferably the devices are manufactured from neoprene, however other materials such as guayule, neogreen, lycra, thermocline, rubber, silicon rubber, plant based elastomers, or combinations thereof can be used.

The material of the device is selected to have a threshold elastic modulus so as to provide the device with the necessary compression and resilience while still maintaining sufficient stiffness to provide adequate support. The overall stiffness of the device may be altered based upon the dimensions of the air cells, spacing between the air cells, and the material used.

In use, pressure is placed on the device which compresses and deforms it. This deformation and compression occurs at one or more of the plurality of hexagonal cells. In the cells to which pressure is applied, the pressure pushes air out of the six-sided vertical structure and corresponding fluid apertures. The air which is pushed out of the one or more cells is forced into adjacent cells.

When pressure is released from the one or more cells a vacuum is created in the cells where air was forced out. The vacuum creates a pressure differential across the apertures between the cells where air was forced into and the cells where air was forced out. This pressure differential sucks the air back into the cells where pressure initially was applied and creates a restorative force causing the cells to spring back to their initial state.

When inlets and/or outlets are provided in the device air can enter the plurality of the cells through the one or more inlets and exit the plurality of the cells through the one or more outlets. This allows fresh air to circulate through the device, helping to prevent heat and moisture from building up within the device.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A cushion device, comprising:
    a plurality of cells arranged in an array, wherein each one of the plurality of cells comprises:
        a plurality of vertical walls interconnected to form a vertical structure,
            wherein each vertical wall of each cell is connected to an adjacent vertical wall of an adjacent cell such that each cell is connected to a plurality of adjacent cells; and
        each of the plurality of vertical walls comprises a port,
            wherein the port of each vertical wall of each cell is in fluid communication with an adjacent port of the adjacent vertical wall of the adjacent cell via a fluid aperture;
    wherein, when external pressure is applied to the cushion device within a first area at one or more of the plurality of cells to compress the one or more of the plurality of cells from an initial state to a compressed state, a fluid flows in a first direction from the first area within the one or more of the plurality of cells into a second area within one or more adjacent cells;
    wherein, when the external pressure is released from the cushion device within the first area at the one or more of the plurality of cells to restore the one or more of the plurality of cells to the initial state from the compressed state, the fluid flows in a second direction opposite the first direction from the second area within the one or more adjacent cells into the first area within the one or more of the plurality of cells; and
    each of the plurality of cells is a hexagonal cell comprising six vertical walls, and wherein each port is a semi-cylindrical port and each fluid aperture is a semi-cylindrical fluid aperture, wherein the semi-cylindrical ports are larger in diameter than the semi-cylindrical fluid apertures.

2. The cushion device of claim 1, wherein the cushion device is a shoe insert or a shoe insole, and wherein each of the vertical structures comprises a top wall and a bottom wall such that the plurality of cells form an enclosed space containing the fluid therein which is prevented from flowing downward towards a ground surface and is prevented from flowing upward towards a foot of a wearer.

3. The cushion device of claim 2, wherein the enclosed space formed between the top walls, the bottom walls, and the vertical walls of the cells contains a cooling fluid therein for cooling the foot of the wearer.

4. The cushion device of claim 3, wherein the cooling fluid comprises hydroxyethyl cellulose, sodium polyacrylate, silica gel, phase change material or combinations thereof for selectively cooling the foot of the wearer.

5. The cushion device of claim 4, wherein the phase change material comprises a phase transition temperature of greater than 100 degrees Fahrenheit, and wherein the cooling fluid changes phase at the phase transition temperature and absorbs heat from the foot of the wearer when the temperature of the foot of the wearer is greater than 100 degrees Fahrenheit.

6. The cushion device of claim 1, wherein the cushion device is manufactured by co-molding, injection molding, or additive manufacturing.

7. The cushion device of claim 1, wherein a material of the cushion device comprises neoprene, guayule, neogreen, lycra, thermocline, silicon rubber, plant-based elastomer, or combinations thereof.

8. A cushion device, comprising:
    a plurality of hexagonal cells arranged in a fluid flow-restricted array, wherein each one of the plurality of hexagonal cells comprises:
        six vertical walls interconnected to form a hexagonal vertical structure,
            wherein each vertical wall of each hexagonal cell is connected to an adjacent vertical wall of an adjacent hexagonal cell such that each hexagonal cell is connected to six adjacent hexagonal cells; and
        a port disposed within each of the plurality of vertical walls, wherein the port of each vertical wall of each hexagonal cell is in fluid communication with an adjacent port of the adjacent vertical wall of the adjacent hexagonal cell via a fluid aperture;

wherein, when external pressure is applied to the cushion device within a first area at one or more of the plurality of hexagonal cells to compress the one or more of the plurality of hexagonal cells from an initial state to a compressed state, a positive pressure differential is created within the first area that causes a fluid to flow in a first direction from the first area within the one or more of the plurality of hexagonal cells into a second area within one or more adjacent hexagonal cells;

wherein, when the external pressure is released from the cushion device within the first area at the one or more of the plurality of hexagonal cells to restore the one or more of the plurality of hexagonal cells to the initial state from the compressed state, a negative pressure differential is created within the first area that causes the fluid to flow in a second direction opposite the first direction from the second area within the one or more adjacent hexagonal cells into the first area within the one or more of the plurality of hexagonal cells; and wherein the cushion device comprises a cooling fluid which comprises hydroxyethyl cellulose, sodium polyacrylate, silica gel, phase change material, or combinations thereof for selectively cooling the foot of the wearer.

9. The cushion device of claim 8, wherein the cushion device is a shoe insert or a shoe insole, and wherein each of the hexagonal vertical structures comprises a bottom wall such that the fluid is prevented from flowing downward towards a ground surface and is forced upward towards a foot of a wearer.

10. The cushion device of claim 8, wherein the cushion device is a shoe insert or a shoe insole, and wherein each of the hexagonal vertical structures comprises a top wall and a bottom wall such that the plurality of hexagonal cells form an enclosed space containing the fluid therein which is prevented from flowing downward towards a ground surface and is prevented from flowing upward towards a foot of a wearer.

11. The cushion device of claim 10, wherein the enclosed space formed between the top walls, the bottom walls, and the six vertical walls of the hexagonal cells contains the cooling fluid therein for cooling the foot of the wearer.

12. The cushion device of claim 11, wherein the cooling fluid comprises a phase change material which comprises a phase transition temperature of greater than 100 degrees Fahrenheit, and wherein the cooling fluid changes phase at the phase transition temperature and absorbs heat from the foot of the wearer when the temperature of the foot of the wearer is greater than 100 degrees Fahrenheit.

13. The cushion device of claim 8, wherein each port is a semi-cylindrical port and each fluid aperture is a semi-cylindrical fluid aperture, and wherein the semi-cylindrical ports are larger in diameter than the semi-cylindrical fluid apertures.

14. The cushion device of claim 8, wherein the cushion device is manufactured by co-molding, injection molding, or additive manufacturing.

15. The cushion device of claim 8, wherein a material of the cushion device comprises neoprene, guayule, neogreen, lycra, thermocline, silicon rubber, plant-based elastomer, or combinations thereof.

16. A cushion device, comprising:
a molded first body comprising a plurality of cells arranged in an array, wherein each one of the plurality of cells comprises:
a plurality of vertical walls interconnected to form a vertical structure enclosed by a bottom surface,
wherein each vertical wall of each cell is connected to an adjacent vertical wall of an adjacent cell such that each cell is connected to a plurality of adjacent cells, and
a semi-cylindrical port disposed within each of the plurality of vertical walls,
wherein the semi-cylindrical port of each vertical wall of each cell is in fluid communication with an adjacent semi-cylindrical port of the adjacent vertical wall of the adjacent cell via a semi-cylindrical fluid aperture such that any two adjacent vertical walls share a common semi-cylindrical fluid aperture; and
a molded second body comprising a top surface, wherein the molded second body is coupled to the molded first body to form a fluid flow restriction between the plurality of cells enclosed by the bottom surface and the top surface,
wherein, when external pressure is applied to the cushion device within a first area at one or more of the plurality of cells to compress the one or more of the plurality of cells from an initial state to a compressed state, a positive pressure differential is created within the first area that causes a fluid to flow in a first direction from the first area within the one or more of the plurality of cells into a second area within one or more adjacent cells,
wherein, when the external pressure is released from the cushion device within the first area at the one or more of the plurality of cells to restore the one or more of the plurality of cells to the initial state from the compressed state, a negative pressure differential is created within the first area that causes the fluid to flow in a second direction opposite the first direction from the second area within the one or more adjacent cells into the first area within the one or more of the plurality of cells, and
wherein the cushion device comprises a cooling fluid which comprises hydroxyethyl cellulose, sodium polyacrylate, silica gel, phase change material, or combinations thereof for selectively cooling the foot of the wearer.

\* \* \* \* \*